No. 728,940. PATENTED MAY 26, 1903.
R. KYLER.
DEVICE FOR EMPTYING PANS OF CLAY MILLS.
APPLICATION FILED MAY 17, 1902.
NO MODEL.
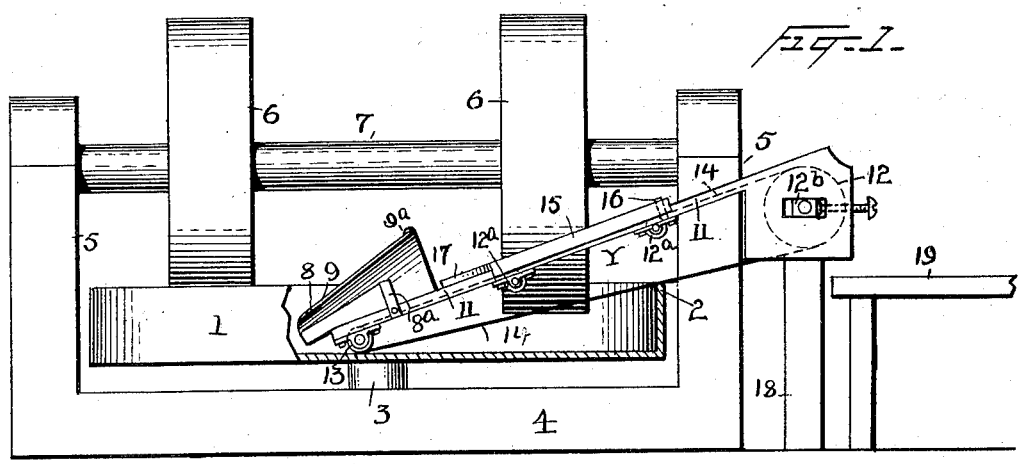
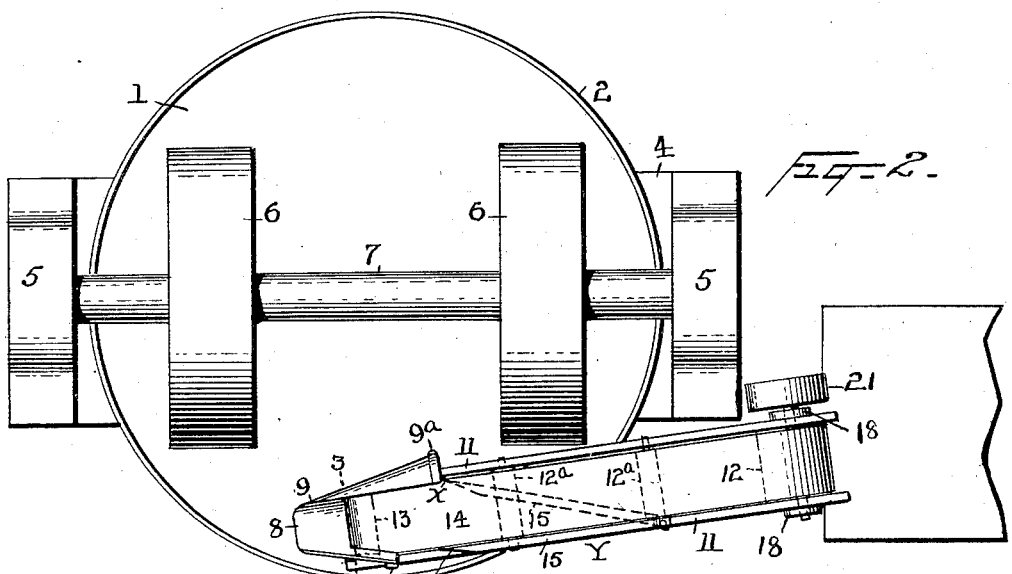
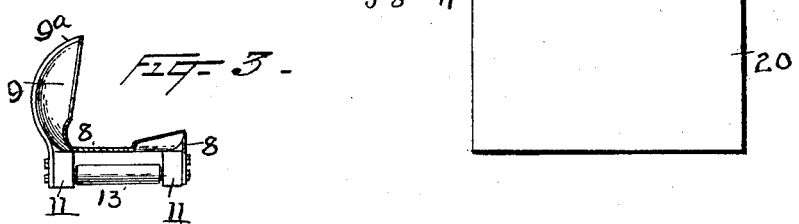
Witnesses
Inventor
Rex Kyler
by E. H. Clark, Attorney No. 728,940. Patented May 26, 1903.

UNITED STATES PATENT OFFICE.

REX KYLER, OF LOCKHAVEN, PENNSYLVANIA.

DEVICE FOR EMPTYING PANS OF CLAY-MILLS.

SPECIFICATION forming part of Letters Patent No. 728,940, dated May 26, 1903.

Application filed May 17, 1902. Serial No. 107,709. (No model.)

*To all whom it may concern:*

Be it known that I, REX KYLER, a citizen of the United States, residing at Lockhaven, in the county of Clinton and State of Pennsylvania, have invented certain new and useful Improvements in Devices for Emptying Pans of Clay-Mills; and I do hereby declare the following to be a full, clear, and exact description of the invention, such as will enable others skilled in the art to which it appertains to make and use the same.

This invention relates to chasing-mills for crushing, grinding, and working plastic clay, ore, or other material, and more particularly to devices for automatically emptying the revolving pan and delivering the ground clay to the place of use or to a receptacle.

The object of my invention is to provide for more effectively and rapidly scooping up the clay from the revoluble pan, shearing it off in a ribbon onto a conveyer-belt, and delivering it either at the rear end of the conveyer or cutting off a portion or whole of the material on the conveyer-belt and delivering it at one side of the conveyer, so that the table and operator at the delivery end of the conveyer need not be disturbed during the continuous delivery of the ground plastic clay to a truck or other receptacle.

The matter constituting my invention herein will be defined in the claims.

I will now describe the details of construction and operation of my improved pan-emptier by reference to the accompanying drawings, in which—

Figure 1 represents an elevation of a mill with a part broken away and my improved emptying device in operative position. Fig. 2 represents a top plan view of the same. Fig. 3 represents a transverse section of the scoop and shear on the line 3 3.

My pan-emptying devices are made with particular reference to use in a wet pan of a clay-tempering mill in which clay, sand, and water are crushed and thoroughly mixed into a plastic mass or dough suitable for molding into various articles. The mass of plastic clay being tenacious, requires not only a scoop but a shear-off having an inclined edge for shearing off a ribbon from the tenacious mass and depositing it on a conveyer-belt traveling below the same for emptying the revolving pan.

The pan 1 is mounted on the central shaft 3, which is supported on the foundation 4 in a well-known manner. In practice suitable gearing is connected with shaft 3 for revolving the pan. The crushing-rollers 6 are loosely mounted on the horizontal shaft 7, having bearings in the standards 5 in the usual manner. In the operation of the mill the clay as it is ground and worked by the crushing-rollers and mixed with water into a plastic mass is driven by centrifugal force toward the circumferential rim 2 of the pan in a favorable position to be automatically taken up by my scoop, sheared off in a ribbon by the shearing device thereof, dropped onto the conveyer-belt, and conveyed thereby to the delivery end thereof or to the cut-off, which deflects it from the conveyer-belt to a lateral discharge-opening, so that the ground plastic clay can be more expeditiously handled and removed from the mill.

My scoop and conveyer, being secured together, are set in an inclined position, with the lower end of the scoop near the bottom of the revoluble pan, as shown in Fig. 1. The scoop 8 is made tapering with a comparatively narrow point and is secured to the frame 11 of the conveyer. The outer side is made comparatively low and is secured to the short standard $8^a$. The inner side is curved and has an inclined edge forming the shear 9. The rear part of this shear 9 is curved upward and outward over the conveyer-belt and is secured to the curved standard $9^a$, as shown in Fig. 3. The central rear portion of the scoop between the shear 9 and the opposite side is cut away to provide an opening $8^b$ for the conveyer-belt 14. Obviously the scoop is not limited in its application and use to any particular kind of conveyer or to the particular type of clay-mill herein shown and described. The conveyer-frame 11 is provided at its delivery end with the roller 12, set in an adjustable journal-box $12^b$, and at its lower end with the roller 13, over which rollers is passed the conveyer-belt 14. Other supporting-rollers $12^a$ are journaled in the frame 11. The upper delivery end of the conveyer-frame 11 is supported upon the vertical standards 18. The working table 19 is preferably placed adjacent to the delivery end of the conveyer. The outer side of the conveyer-frame 11 is provided with an adjustable cut-off 15, which is pivotally connected by a pin or hinge 16 to the frame 11 and has a lower beveled and sharpened end 17 adjacent to the rear end of the scoop. This cut-off 15 can be readily swung inward in an inclined position to the point X at the inner side of the conveyer, as indicated by dotted lines in Fig. 2, for the purpose of cutting off and deflecting the ribbon of clay on the conveyer-belt to the lateral discharge-opening at Y. A truck 20 or other receptacle may be placed below the lateral discharge-opening Y for receiving the clay whenever it is to be deflected and discharged at the lateral opening.

In practice the leading edge or point of the scoop 8 will be placed a short distance above the bottom of the pan in the most favorable position for engaging with the ground mass of plastic clay and removing a ribbon thereof as the pan revolves, the scoop being suspended or supported in the desired position in any well-known manner. Such suspending or supporting means may also be arranged for raising the scoop above the pan when desired. Since such supporting device does not form a part of my invention, it is not herein illustrated. As the plastic clay is taken up by the scoop it is sheared off in a ribbon by the curved shear 9, having a long inclined edge, and is then properly guided thereby and dropped onto the conveyer-belt 14, by means of which it is carried up the conveyer and discharged at the rear upper end Z thereof onto the molding-table 19, where the attendant works it into the molds. When the mill is running, it will grind a great deal more clay than can be used by one molder at the table 19, and it is desirable, therefore, to provide for discharging the ground plastic clay without removing the table 19 or disturbing the molder who is working there. In order to provide for the continuous running of the mill and discharge of the ground plastic clay, I have devised the cut-off 15, which at the proper time after the molder at table 19 has been supplied will be swung into the inclined position indicated by dotted lines in Fig. 2, with its inner point at X against the inner wall of the frame 11, thereby forming a lateral opening at Y. The ribbon of ground plastic clay will be discharged at Y onto the truck 20 or other receptacle, by means of which it can be conveyed to any place of use. When the molder at table 19 requires a further supply of clay, the cut-off 15 will be swung back into the normal position in the outer wall of frame 11, and the clay will then be conducted by the belt 14 and discharged onto the table 19. It will be evident that by means of this device the mill may be kept running more continuously, the molder at table 19 left undisturbed at his work, and the clay discharged, when desired, at the lateral opening Y.

A belt-pulley 21 is secured to the shaft of the rear roller 12 for application of the power-belt to drive the conveyer-belt 14.

Having described my invention, what I claim, and desire to secure by Letters Patent, is—

1. In a clay-mill, the combination with the revoluble pan, of a conveyer-frame having a traveling belt, a scoop and a shear-off secured to the inner end of said frame, said shear-off being curved upward and having an inclined shearing edge above the belt, substantially as and for the purpose described.

2. In a clay-mill, the combination with the revoluble pan, of a conveyer-frame having a conveyer-belt, a scoop secured to the lower end of said frame and having a rearwardly-extending lateral shear-off curved up over said belt and having an inclined edge tapering from its rear end to the entering edge of the scoop, whereby the clay, as received by the scoop, will be sheared off in a ribbon and caused to drop on the conveyer-belt, substantially as described.

3. A pan-emptier scoop constructed with a narrow entering end, a turned-up inclined side, an opposite lateral shear-off made wide at the rear, curved inward over the bottom and having an inclined tapering edge to said entering end, and the bottom of the scoop having an opening $8^b$ between said tapering side and the opposite shear-off, substantially as and for the purpose described.

In testimony whereof I affix my signature in presence of two witnesses.

REX KYLER.

Witnesses:
L. C. ANDREWS,
WARREN KYLER.